US008868929B2

(12) United States Patent
Robles et al.

(10) Patent No.: US 8,868,929 B2
(45) Date of Patent: Oct. 21, 2014

(54) METHOD OF MASS STORAGE MEMORY MANAGEMENT FOR LARGE CAPACITY UNIVERSAL INTEGRATED CIRCUIT CARDS

(75) Inventors: Javier Canis Robles, Madrid (ES); Robert C. Chang, Danville, CA (US)

(73) Assignee: Microelectronica Espanola S.A.U., Madrid (ES)

( * ) Notice: Subject to any disclaimer, the term of this patent is extended or adjusted under 35 U.S.C. 154(b) by 1097 days.

(21) Appl. No.: 12/226,576

(22) PCT Filed: Apr. 4, 2008

(86) PCT No.: PCT/ES2008/000215
§ 371 (c)(1),
(2), (4) Date: Oct. 22, 2008

(87) PCT Pub. No.: WO2009/125024
PCT Pub. Date: Oct. 15, 2009

(65) Prior Publication Data
US 2010/0185874 A1 Jul. 22, 2010

(51) Int. Cl.
*G06F 21/78* (2013.01)
*G06F 21/77* (2013.01)
*G06F 21/34* (2013.01)
*G06F 21/60* (2013.01)
*G06Q 20/34* (2012.01)

(52) U.S. Cl.
CPC ............... *G06F 21/78* (2013.01); *G06F 21/77* (2013.01); *G06F 21/34* (2013.01); *G06F 21/60* (2013.01); *G06Q 20/3576* (2013.01)
USPC .................. 713/193; 726/9; 726/20

(58) Field of Classification Search
None
See application file for complete search history.

(56) References Cited

U.S. PATENT DOCUMENTS

| 2005/0171983 | A1* | 8/2005 | Deo et al. ............... 707/202 |
| 2007/0006322 | A1* | 1/2007 | Karimzadeh et al. ....... 726/27 |
| 2008/0104348 | A1* | 5/2008 | Kabzinski et al. ......... 711/164 |

FOREIGN PATENT DOCUMENTS

EP 1 607 872 12/2005
(Continued)

OTHER PUBLICATIONS

"Introduction to SIM Cards", Sep. 20, 2007, Elatec, Slides, downloaded Nov. 1, 2011 from http://read.pudn.com/downloads144/ebook/628994/SIM%E4%B8%93%E8%BE%91/Introduction%20to%20Introduction%20to%20SIM%20Cards%20SIM%20Cards.pdf.*

(Continued)

*Primary Examiner* — Alexander Lagor
(74) *Attorney, Agent, or Firm* — Katten Muchin Rosenman LLP (57) ABSTRACT

In one embodiment, a method for managing information in a large capacity UICC is provided comprising storing content of a file in a mass storage file system of the large capacity UICC, associating the file in the mass storage file system with a file in an ISO file system of the large capacity UICC, wherein the ISO file is associated with a security configuration defining security requirements for allowing its access; and hiding the content of the file in the mass storage file system in order to make it inaccessible. The method can further comprise requesting access from the mass storage file system to content of a file in the mass storage file system; and, if hidden, delivering security requirements to the ISO file system and determining whether the delivered security requirements agree with the security configuration of the file in the ISO file system associated with the file in the mass storage file system; and, if so, revealing the content to make it accessible.

16 Claims, 7 Drawing Sheets

(56) References Cited

FOREIGN PATENT DOCUMENTS

| | | | |
|---|---|---|---|
| EP | 1607872 | A1 | 12/2005 |
| WO | 2007066326 | A2 | 6/2007 |
| WO | WO 2007/066326 | | 6/2007 |

OTHER PUBLICATIONS

Search Report and Written Opinion for PCT/ES2008/000215, 11 pages, Sep. 16, 2008.

European Office Action dated Nov. 25, 2013, from the corresponding European Application No. 08 761 462.4—1956.

\* cited by examiner

(PRIOR ART)

METHOD OF MASS STORAGE MEMORY MANAGEMENT FOR LARGE CAPACITY UNIVERSAL INTEGRATED CIRCUIT CARDS

FIELD OF THE INVENTION

The present invention relates to mobile communications and, more particularly, to mobile communications which use Universal Integrated Circuit Cards (UICC) comprising mass storage capacity and high-speed protocols to communicate with a mobile terminal, with the high-speed protocols being used here to exchange data from the mass storage memory in a secure way under control by the mobile network operator.

BACKGROUND

In the context of the disclosure herein, the following terms and expressions can be interpreted as set forth below:
Smart card, chip card or integrated circuit card (ICC): is any pocket-sized card with embedded integrated circuits which can process information.
UICC (Universal Integrated Circuit Card): is the smart card, chip card or integrated circuit card used in mobile terminals in GSM and UMTS networks. In a GSM network, the UICC contains a SIM application and in a UMTS network it is the USIM application. A UICC may contain several applications, making it possible for the same smartcard to give access to both GSM and UMTS networks, and also provide storage of a phone book and other applications. It is also possible to access a GSM network using an USIM application and it is possible to access UMTS networks using a SIM application with mobile terminals prepared for this.
SIM (Subscriber Identity Module): is part of a removable smart card or ICC (Integrated Circuit Card), also known as SIM Card, for mobile cellular telephony devices such as mobile computers and mobile phones. It is managed by a GSM mobile network operator (MNO) and comprises a module for identifying a subscriber who accesses a MNO. It is also capable of storing subscriber information, such as its agenda or text messages.
USIM (Universal Subscriber Identity Module: is an application for UMTS mobile telephony running on a UICC (Universal Integrated Circuit Card), also known as USIM Card, which is inserted in a 3 G mobile phone.
MegaSIM Card: is a large capacity Universal Integrated Circuit Card (UICC). In other words, it is a SIM Card or USIM Card which additionally comprises a large amount of storing capacity (i.e. more than 128 MBytes), typically flash memory, which allows the subscriber and the MNO to store a large amount of information, such as video or images. A large capacity Universal Integrated Circuit Card (UICC) or MegaSIM Card usually comprises a high-speed communications interface, such as USB but not limited thereto, which allows offering services which imply a large exchange of information. MegaSIM is a registered term (MegaSIM™) by MSYSTEMS LTD., Kefar Saba, Israel.
USB Inter chip (USB-IC): is an electrical interface between the Universal Serial Bus (USB) interface of a large capacity UICC or MegaSIM card and the device supporting said USB. This interface is an adaptation of the interface USB 2.0 designed for short-distance communications. It only refers to electrical parameters.
USB Mass Storage Device Class (USB MSC): is a set of computing communications protocols, developed by the USB Implementers Forum, Inc. (www.usb.org), which run on the USB and allow a USB host to access to files stored in a File Allocation Table (FAT). USB MSC provides a standardized interface to a variety of storage devices (e.g., flash memories), through which allows the host to access a storage device by simple read/write operations on data sectors. This basic funcionality of USB MSC requires no file system.
File Allocation Table (FAT) is a file system developed by Microsoft. Typically, the disk formatting scheme used in a large capacity UICC or MegaSIM card is FAT32, which allows a maximum file size of 4 Gbytes.

A large capacity UICC or MegaSIM card fulfils the standard (U)SIM functionalities and has extra non-volatile memory for data and application storage, typically comprising both Flash Memory and Electrically-Erasable Programmable Read-Only Memory (EEPROM).

The EEPROM memory of the MegaSIM card is part of the standard SIM functionality and one of its usages is to store SIM data files which are managed via the ISO 7816 interface through the (U)SIM application. Such data files are protected by the (U)SIM application, being required, for an external entity which requires the access to any file, to fulfil the security requirements associated with each access type. Security requirements are based on the presentation of keys. Access types include: read, update, increase, create, delete, invalidate, rehabilitate. Thus, it is considered a highly-secure memory component because the EEPROM memory access is always under the control of the SIM controller, which is more secure than the conventional mass storage memory.

The mass storage memory of the MegaSIM Card consists of a commercial Flash Memory, conventionally without special security mechanisms. User data such as pictures, video, music and applications are stored in this mass storage memory. Unlike the EEPROM, the Flash Memory is usually formatted as a standard FAT32 file system, which is managed by the operating system of the host device (e.g., the mobile terminal) and not by the (U)SIM operating system itself. The mass storage memory is accesible by a standard mass storage protocol (MSP) through a high-speed interface, such as USB-IC, MultiMedia Card (MMC) interface, or Secure Digital (SD) card interface, for example among others.

Therefore, two different file systems can be located in a MegaSIM Card: ISO File System, which is accessed by host applications through (U)SIM application via ISO 7816 interface; and mass storage file system, which is accessed by host application through the host operating system (host OS).

Figure 1:
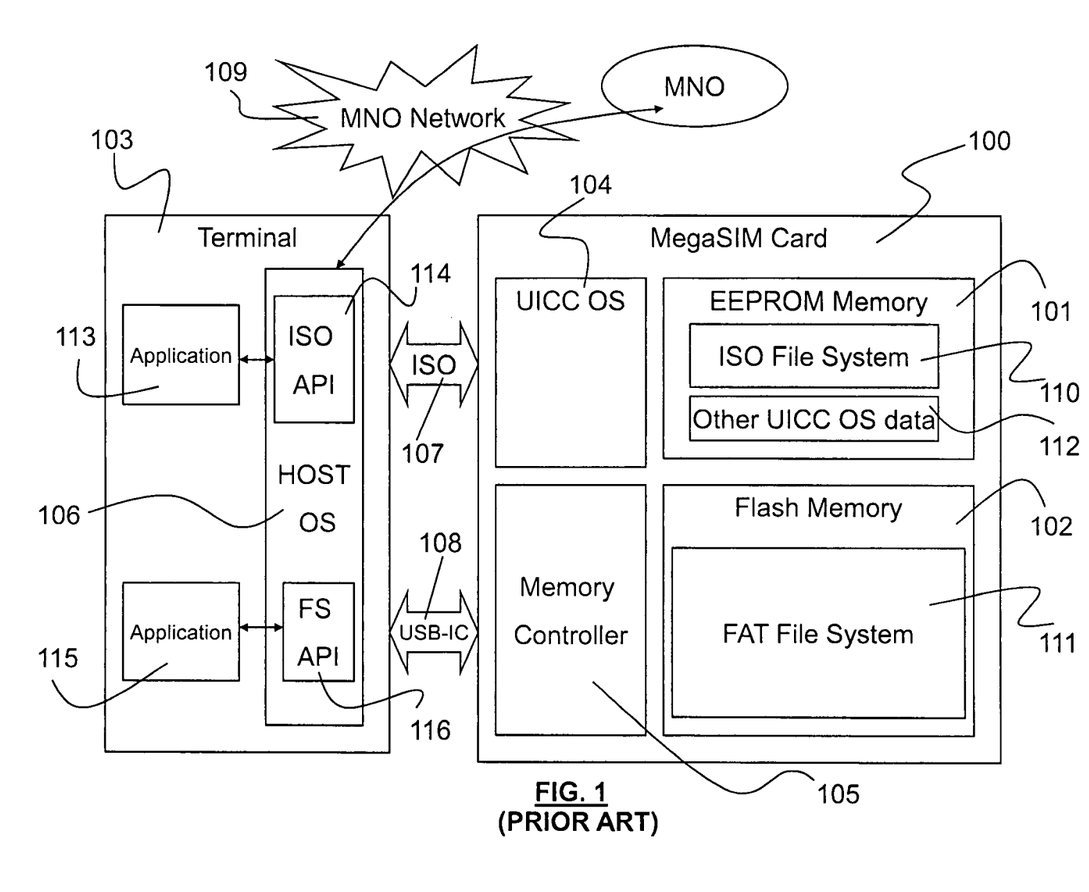
FIG. 1 shows a schematic block diagram of a large capacity UICC architecture and the exchanging with a host device of information stored in the ISO and FAT file systems of the large capacity UICC.

FIG. 1 shows the physical entities involved in exchanging information stored inside the non-volatile memory modules of a large capacity UICC (100): a EEPROM memory (101) where the ISO file system (110) is located; a mass storage memory (102), like a Flash Memory, which stores a FAT file system (111); a host device (103) that is the mobile terminal; and a mobile network operator (MNO) communicating with said host device (103) through the mobile network (109). The EEPROM (101) and the mass storage memory (102) are located within the large capacity UICC (100), which is sited in the host device (103). For the MegaSIM or large capacity UICC (100), the exchanging of information stored in the EEPROM (101) between the host device (103) and its large capacity UICC (100) is carried out using the standard ISO 7816 channel (107), accessing to the EEPROM (101) by the UICC operating system or UICC OS (104); while the exchanging of information stored in the mass storage memory (102) associated to a memory controller (105) is managed by the host operating system (106), which uses a high-speed channel (108), for example according to the specifications USB-IC, between the host device (103) and the large capacity UICC (100). The functionalities of the UICC operating system (104) are offered to a specific application (113) running in the host device (103) by means of a ISO Application Programmer Interface or ISO API (114), in order to, for example, allow authentication in a GSM network to send SMS. Another application (115) running in the host device (103) can access to the mass storage memory (102) by means of a File System Application Programmer Interface or FS API (116), which uses the USB MSC and USB-IC, in order to, for example, write into a file of the FAT file system (111). On the other hand, the EEPROM memory (101) is capable of storing other UICC OS data (112), such as data for internal card applications and applications (e.g., SIM or USIM applications) controlled by the UICC OS (104), which are accessible to external applications by means of the ISO API (114) and exchangable through the ISO 7816 channel (107).

Figure 2:
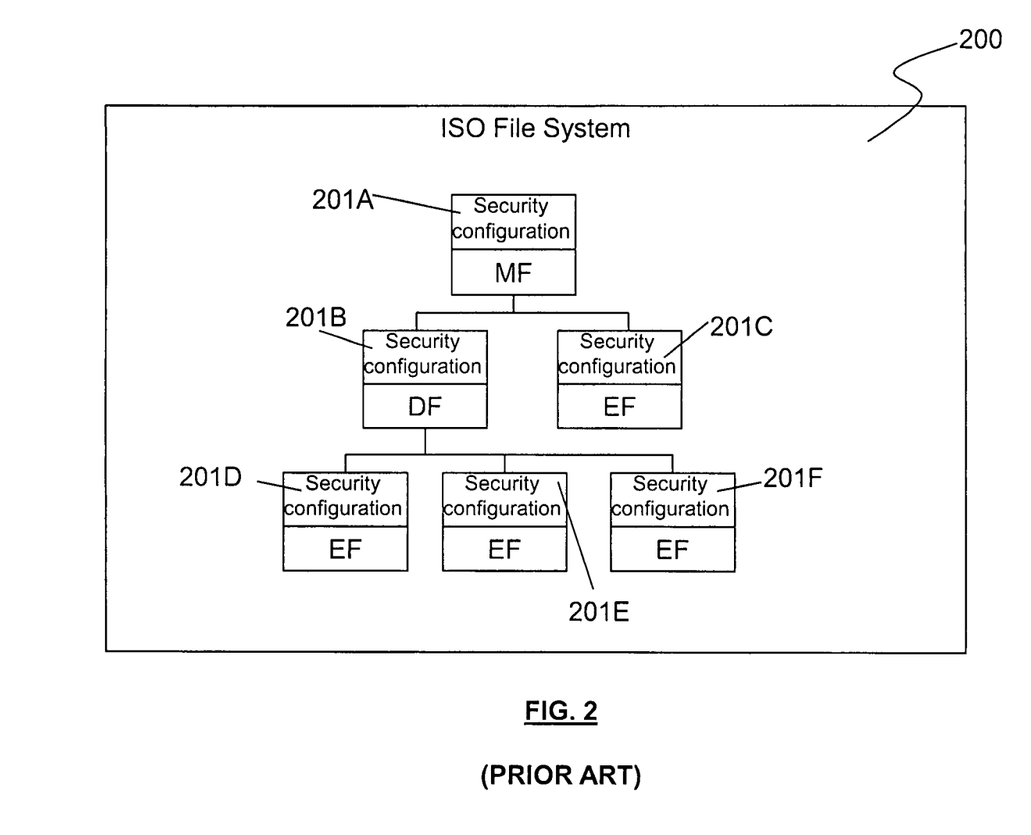
FIG. 2 shows a schematic block diagram of an ISO file system architecture.

The ISO file system (110) in the EEPROM memory (101) of the large capacity UICC (100) can have a hierarchical file system structure (200), as defined in ISO 7816-4 and shown in FIG. 2. ISO 7816-4 file system supports three types of files: master file (MF), dedicated file (DF) and elementary file (EF). Every file of this ISO file system (110) is associated to certain security requirements according to a security configuration (201A, 201B, 201C, 201D, 201E) defined specifically for the file. Thus, each file and directory content in the ISO file system (110) is accessible only if the defined security requirements are met; otherwise, the UICC OS (104) returns an error to the external application requesting access to the ISO file system (110) through the standard ISO 7816 channel (107).

Figure 3:
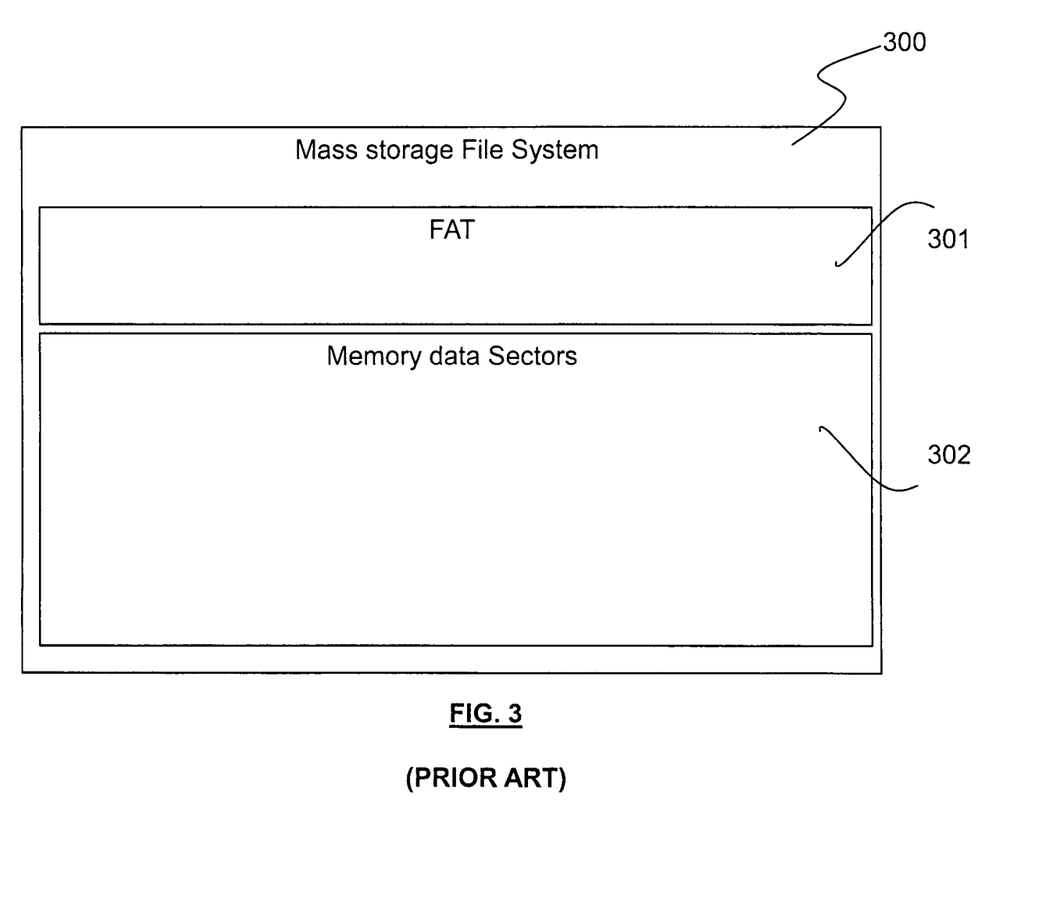
FIG. 3 shows a schematic block diagram of a mass storage file system architecture.

The FAT file system (111) located in the mass storage memory (102) of the large capacity UICC (100) is a mass storage file system (300), depicted in FIG. 3, which has the file contents stored in memory data sectors (302). These memory data sectors (302) are allocated and managed externally by the host operating system (106). The host operating system (106) address to the concrete memory data sectors (302) through a file allocation table or FAT (301) which is a list of entries that map to each sector and in turn located in memory sectors of the mass storage memory (102).

There are problems related to the files stored in the mass storage memory of MegaSIM cards, including lack of security, since these files are handled by standard mass storage protocols (MSP) that do not support access to the content of files in a secure manner, and standard access not allowing the mobile network operator (MNO) to control the content of the mass storage memory inside a MegaSIM cards.

The lack of security of content which is stored in the mass storage memory has already been addressed by secure protocols such as the TrustedFlash™ protocol.

The TrustedFlash™ protocol provides several types of authentication algorithms and allows for multiple authenticated entities to concurrently use the card. The TrustedFlash™ security system allows for configuring a specific set of permissions (rights) for every authenticated entity. Every command that is received by a flash memory module is associated with a currently authenticated entity, and the service request is validated against the registered rights for that entity. The flash memory module grants the request and executes the command only if the service is permitted for the requesting entity. TrustedFlash™ is a trademark of SanDisk Corporation.

Figure 4:
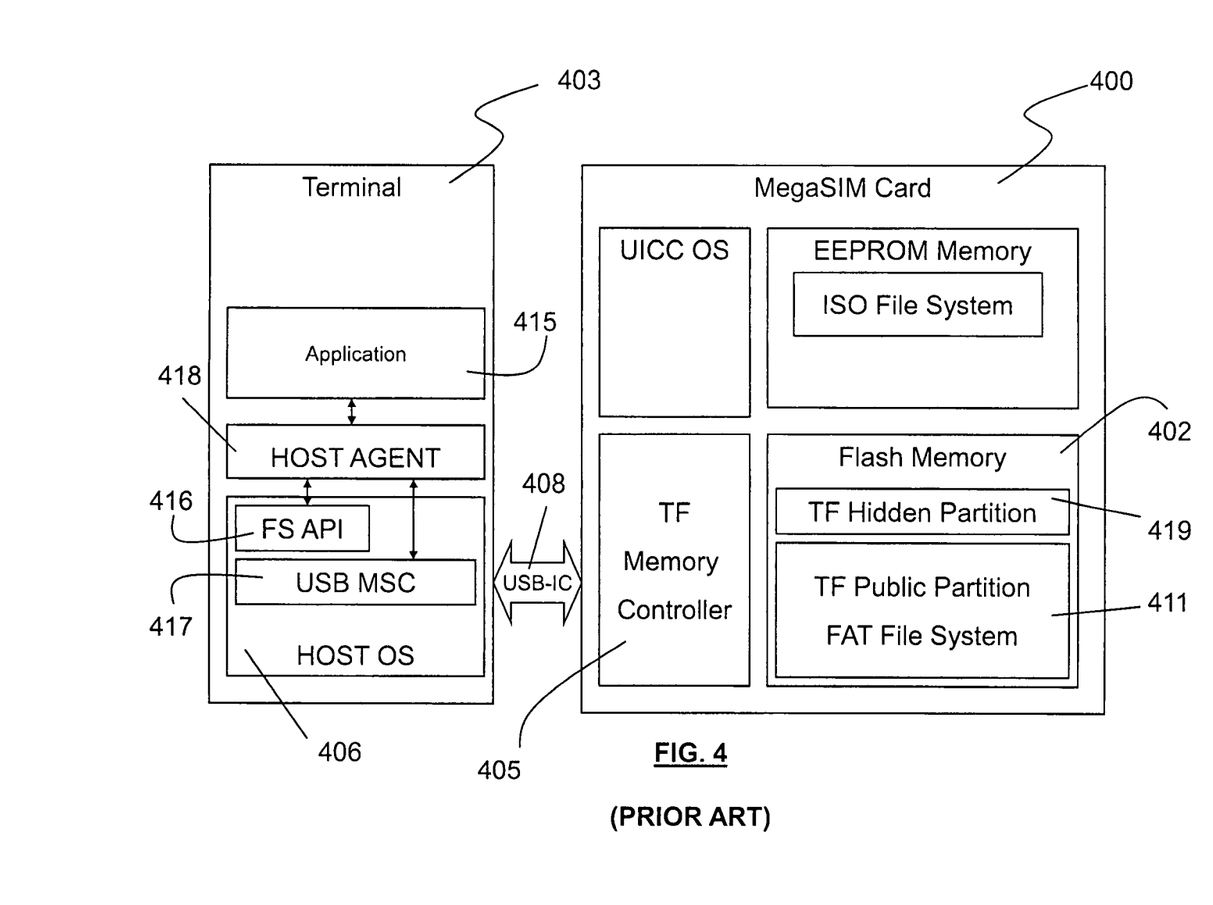
FIG. 4 shows a schematic block diagram of a Trusted-Flash™ secure file system architecture.

In a TrustedFlash™ secure file system, as shown in FIG. 4, a large capacity UICC (400) is provided with a public partition (411), typically of a flash memory (402) and formatted as a conventional FAT file system, and a private or hidden partition (419) of the same flash memory (402).

The public partition (411) is visible to the standard host operating system (406) and accessible through the standard memory card interface. The host operating system (406) is provided with File System Application Programmer Interface or FS API (416) for allowing an application (415) to access the public partition (411).

The hidden partition (419) is accessible only through a TrustedFlash Application Programmer Interface implemented by the Host agent (418) for communication with a TrustedFlash memory controller (405) located in the large capacity UICC (400).

Each hidden partition (419) stores read-only contents or license objects, content encryption keys and credentials, etc., for protected contents in public partition. Using them, the files contained within the public partition boundary are protected by encryption to unauthorised applications of a host device (403). By preventing the host operating system (406) from accessing the hidden partition (419), the TrustedFlash memory controller (405) is required for delivering physical protection of the data files contained within said partition. The host operating system (406) is provided with the USB Mass Storage Device Class or USB MSC (417) for exchanging TrustedFlash™ commands with the TrustedFlash memory controller (405) in order to, for example, authenticate a user in the system and create a secure channel, over a high-speed physical channel (408), through which the authorised application (415) can access to some content stored in hidden partition (411) or public partition (411).

The TrustedFlash™ secure file system requires a host agent (418) in the host device (403) cooperating with the TrustedFlash memory controller (405) of the large capacity UICC (400). The host agent (418) implements an intermediate layer between the host operating system (406) and the application (415) running in the host device (403). When this application (415) requires access to a file through the FS API (416) and finds its content protected by encryption, the application (415) authenticates in the entity associated to the required content from the public partition (419) using the host agent (418) services. To relieve the application from handling the checking whether the file is encrypted, the checking can be handled by a file system filter layer between application and the file system. If the file system filter is implemented, the filter determines if the host agent or the host file system will be used for accessing this file.

A drawback of the secure protocols for access mass storage memory in MegaSIM cards, as the above described TrustedFlash™ protocol, is the fact that current mobile terminals do not support them and require a specific software agent to handle a given secure protocol.

Furthermore, existing bearers controlled by the MNO like SMS or GPRS, which allow the management of the ISO functionality, do not cover the management of the secure mass storage feature.

SUMMARY OF VARIOUS EMBODIMENTS OF THE INVENTION

The above mentioned problems are addressed by use of the security mechanisms associated with files in a standard ISO (developed by the International Organization for Standardization) file system and by associating such security mechanisms to files in a mass storage file system, where both file systems are of a large capacity universal integrated circuit card (a large capacity UICC, such as a MegaSIM™ card).

Various embodiments are possible to carry out the foregoing, including methods and systems for managing information in a large capacity universal integrated circuit card.

In one embodiment, a method is provided for managing information in a large capacity universal integrated circuit card (large capacity UICC). The large capacity UICC comprises a mass storage file system (typically, a FAT file system in a Flash memory) and an ISO file system (typically, in a EEPROM). This method instance comprises the following steps:

storing content of a file (content of one or more files) in the mass storage file system;

associating the file in the mass storage file system with a file in the ISO file system, wherein the file in the ISO file system is associated with a security configuration that defines certain security requirements for allowing access to the file in the ISO file system; and     hiding the content of the file in the mass storage file system in order to protect said content, so that no unauthorised external application can access said file without granting the security requirements of the file in the ISO file system which has been associated to the (hidden) file in the mass storage file system.

The storing of data of at least one file in the mass storage file system (hereafter called "MS files") can be performed by any conventional means of the specific mass storage file system (e.g., a FAT file system).

By associating the, at least one, file in the mass storage file system with one or more ISO files, which are created and associated with corresponding security requirements in the ISO file system, said security requirements become in turn associated also with the file in the mass storage file system. Therefore, this association of MS files with ISO files solves the lack of security in the mass storage file system.

This step of associating files and, besides, the step for protecting the content in the mass storage file system by hiding the content of the MS file (for example, by using a encryption key) are carried out within the large capacity universal integrated circuit card by a mass storage security controller (hereafter "MS security controller"). The mass storage secure controller is capable of communicating with the ISO file system to determine, when access to a (hidden) MS file is requested whether the security requirements of the ISO file associated with said MS file are granted. In addition to these functionalities, the mass storage secure controller can access the mass storage file system to reveal the content of the MS file if said security requirements have been granted.

Thus, in a particular embodiment, the method for managing information in a large capacity UICC may further comprise the following steps:

requesting access from the mass storage file system to content of a MS file; and, if its content is hidden,     delivering security requirements to the ISO file system and determining whether the delivered security requirements meet the security requirements defined by the security configuration associated with the ISO file which has been associated (by the MS security controller of the large capacity UICC) with said MS file; and, if the security requirements are met,     revealing the content of the MS file (for example, the content is revealed by the MS security controller using a decryption key).

An external application can communicate with the large capacity UICC in order to request access to content of an MS file from the mass storage file system. In this particular embodiment, the application is running on a host device and request access from the mass storage file system the large capacity UICC by using a File System Application Programmer Interface (FS API) which the host operating system provides with. This step of requesting access is performed through a high speed channel (e.g., USB, MMC, SD, etc.).

In case that the content of the requested file is hidden, the application delivers certain security requirements to the ISO file system. Only if the delivered security requirements meet the security requirements corresponding to the security configuration of the ISO file associated with the requested MS file, the content is revealed to the application. The delivering of the security requirements can be performed through an ISO channel (preferably, via an ISO 7816 interface), but also other channels provided by the large capacity UICC can be used (for instance, a high speed channel such as USB IC).

Once the content of the requested file in the mass storage file system has been revealed by the MS secure controller of the large capacity UICC, the application running in the host device can normally access the MS file. The delivering of the revealed content from the mass storage file system to the application is performed through the high speed channel, so accessing to the clear content of the MS file avoids using a low speed channel as ISO channel is (note that ISO 7816 interface is only used in the previous step of delivering security requirements).

Another embodiment relates to a large capacity universal integrated circuit card (large capacity UICC) which comprises:

a universal integrated circuit card (UICC) operating system,     an ISO file system controlled by the UICC operating system,     a mass storage file system,     a mass storage secure controller configured to perform the following functions:

communicating with the ISO file system,         accessing the mass storage file system,         associating one or more files (a MS file) in the mass storage file system with at least one file (ISO file) in the ISO file system, wherein the ISO file is associated with a security configuration defining security requirements for allowing access to said ISO file.

Additionally, the mass storage secure controller of the proposed large capacity UICC is capable of hiding content of a file in the mass storage file system to make it inaccessible. Then, when the security requirements of the ISO file associated with said file in the mass storage file system are met, the mass storage secure controller is configured to reveal the content of the file in the mass storage file system previously hidden (for example, by decrypting the content using a key determined by the mass storage secure controller), in order to allow right access to said content.

In a particular embodiment, the large capacity UICC comprises a memory controller which provides an external application running in a host device with access to the mass storage file system. The large capacity UICC also has means for communicating with the external application, said means include in a preferred embodiment:

an ISO interface (e.g., ISO 7816) for communicating the UICC operating system with the application through a host operating system;

a high speed interface (e.g., USB, MMC, SD, etc.) for communicating the memory controller with the application through the host operating system.

The ISO interface is used by the application running in the host device for delivering to the ISO file system of the large capacity UICC certain security requirements in order to be allowed to access the content of a (hidden) MS file. Said security requirements corresponds to the security configuration defined for the ISO file which is associated with the MS file whose content is requested to be accessed by this application.

The high speed interface is used by the mass storage file system for delivering to the application the content of the file in the mass storage file system. If the security requirements delivered by the application meet the security requirements defined by the security configuration defined for the ISO file associated with the file in the mass storage file system, the content is delivered through high speed interface once the mass storage secure controller has revealed it (for example, by decrypting the content using a key determined by the mass storage secure controller).

In various implementations, a mobile terminal embodies a large capacity universal integrated circuit card as described herein.

In yet another embodiment, a device including logic circuitry adapted to perform the steps of the method for managing information in a large capacity universal integrated circuit card described before. Alternatively, firmware or software may replace part or all of the logic circuitry in the device. This device can be implemented entirely or as part of a smart card, a computer, a digital signal processor, a field-programmable gate array (FPGA), an application-specific integrated circuit (ASIC), a micro-processor, a micro-controller, or any other form of programmable hardware.

The advantages and variations of such embodiments will become further apparent from the description that follows.

BRIEF DESCRIPTION OF THE DRAWINGS

To complete the description and in order to provide for a better understanding of the various embodiments, a set of drawings is provided. Said drawings form an integral part of the description and illustrate examples including a preferred embodiment, which should not be interpreted as restricting the scope of the invention, but just as an example of how the invention can be practiced. The drawings comprise the following figures.

DETAILED DESCRIPTION OF VARIOUS EMBODIMENTS OF THE INVENTION

In this text, the term "comprises" and its derivations (such as "comprising", etc.) should not be understood in an excluding sense, that is, these terms should not be interpreted as excluding the possibility that what is described and defined may include further elements, steps, etc.

Figure 5:
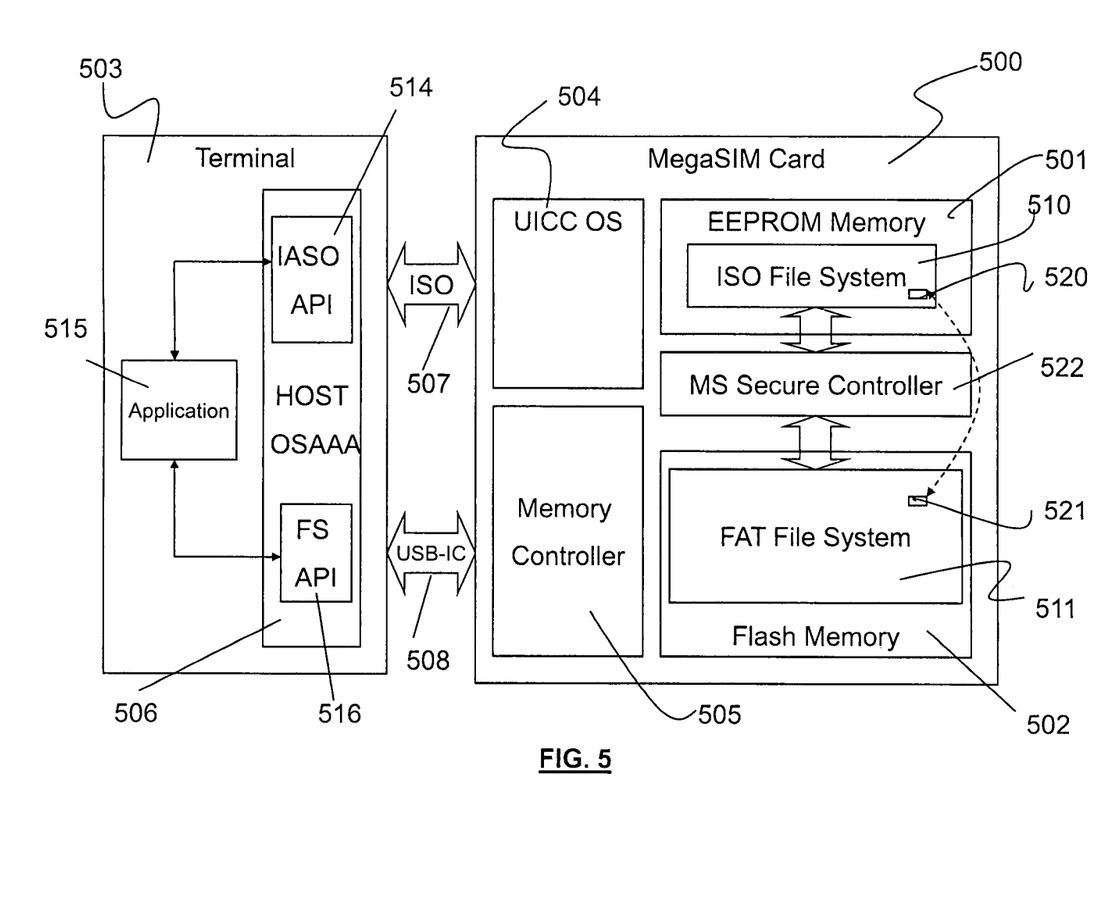
FIG. 5 shows a schematic block diagram of a large capacity UICC architecture and the secure exchanging with a host device of information stored in the mass storage file system of the large capacity UICC.

FIG. 5, illustrates a large capacity universal integrated circuit card (500) for implementing a secure management of the information. This large capacity universal integrated circuit card (500) comprises an ISO file system (510), conventionally allocated in an EEPROM memory (501), and a mass storage file system (511), typically allocated in a Flash memory (502). Within the large capacity universal integrated circuit card (500), both file systems are related by a mass storage secure controller (522), which is capable of mapping files, being able to access any file (521) stored in mass storage file system (511) and being able to control whether an ISO file (520) mapped to the former has the required security granted or not. In order to grant a secure access, the mass storage file system (511) has the file contents hidden, for example, by using an encryption key determined by the mass storage secure controller (522).

The mass storage secure controller (522) controls when the security of the associated ISO file (520) is fulfilled and if so, the mass storage secure controller (522) reveals the associated mass storage file content. Mass storage secure controller (521) communicates with ISO file system (510), which is managed by the UICC operating system (504), in order to know where security requirements are fulfilled. The mass storage secure controller (521) can only access to the file (521) of the mass storage file system (511) in order to hide the content or reveal it when said security requirements are granted.

An application (515) running in a host device (503) can send a request to the large capacity universal integrated circuit card (500) requiring access to the mass storage memory (502) through the File System Application Programmer Interface (516) of the host operating system (506). In case that the file required by the application (515) has its content hidden, said application (515) selects from the ISO file system (520), and by means of the ISO Application Programmer Interface (514) of the host operating system (506), the ISO file (520) mapped to the required file (521) of the mass storage file system (511). And in such case, the application (515) delivers the security requirements defined for said associated ISO file (520) through the ISO 7816 channel (507).

The mass storage secure controller (522) is only allowed to access the mass storage files, while the host operating system (506) from a host device (503) is managing the mass storage file system (511). There is no need for an intermediate firmware between the host operating system (506) and the application (515) requiring access to a hidden content stored in a file of the mass storage file system (511). This is an advantage with respect to the TrustedFlash™, wherein a host agent is required.

Figure 6:
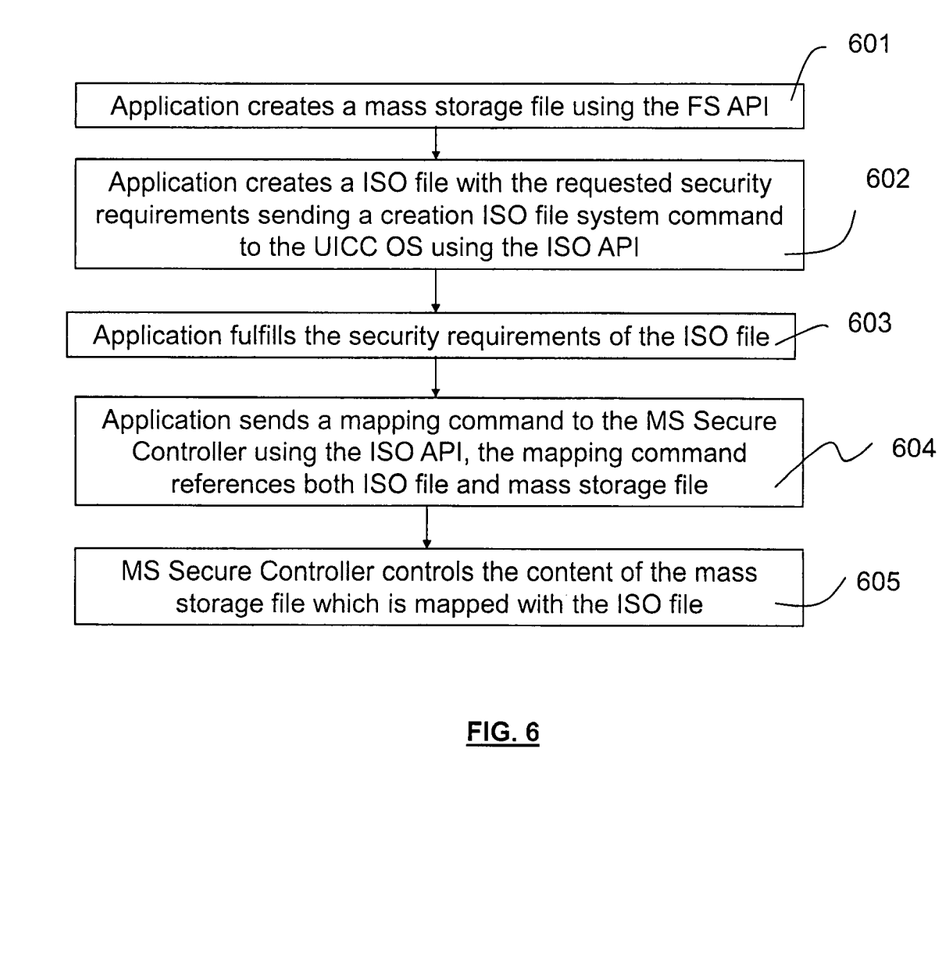
FIG. 6 shows a diagram illustrating steps for mapping files of the ISO file system to the mass storage file system.

FIG. 6 illustrates in a diagram of steps (600) how the mapping process is carried out prompted by an access request to the mass storage file system (522) from an application (515). The application (515) performs a first step of creating (601) a file (521) of the mass storage file system (511) by means of the File System Application Programmer Interface (516). Also, the application (515) sends a command to the UICC operating system (504) through the ISO Application Programmer Interface (514) in order to create (602) an associated ISO file (520) in the ISO file system (510) with the security requirements corresponding to a predefined security configuration and granted (603) by the application (515). By using the ISO Application Programmer Interface (514), a mapping command is sent (604) from the application (515) to the mass storage secure controller (522). After receipt of the mapping command, the mass storage secure controller (522) associates the created ISO file (520) and the file (521) of the mass storage file system (511) by corresponding file references, as well as it takes control of the content (605) stored in said file (521) of the mass storage file system (511), so that the mass storage secure controller (522) can reveal the content (605) of the file (521) when the application (515) fulfils the security requirements of the mapped ISO file (520) or hide the content otherwise.

Figure 7:
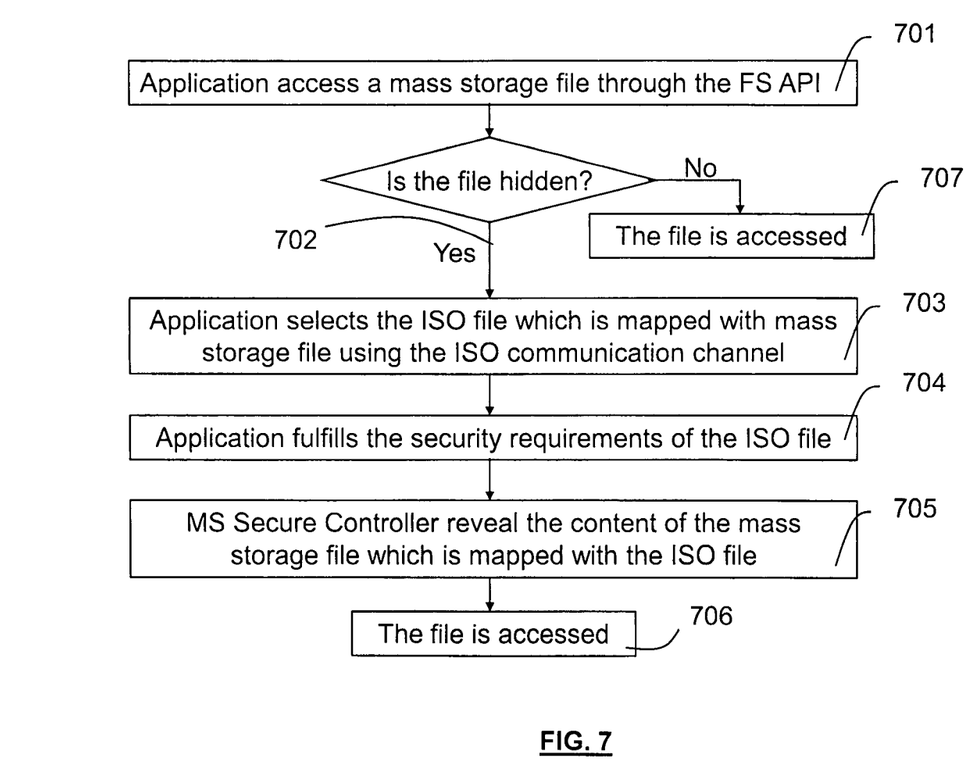
FIG. 7 shows a diagram illustrating steps for secure accessing files of the mass storage file system, in accordance to an embodiment.

In FIG. 7, a flow diagram (700) describes the steps followed by an application (515) requiring access (701) to a file (521) of the mass storage file system (511). If its content is clear, the application (515) accesses (707) the file (521); but if it is hidden (702), the application (515) has to first access (703) the ISO file system (520) and deliver the security requirements (704) for the ISO file (520) which is mapped to the file (521) of the mass storage file system (511). Then, since the security requirements are met, the mass storage secure controller (522) reveals the content (705) of the file (521) so that the application (515) can finally access (706) the cleared content.

The embodiments of the invention are not limited to those described herein, but may encompass any variations, for example, as regards the choice of components, steps, configuration, etc.). Thus, the scope of the appended claims should not be limited to the embodiments described herein.

The invention claimed is:

1. A method for managing information in a large capacity universal integrated circuit card, the method comprising:
   securely storing a mass storage file in a mass storage file system of a large capacity universal integrated circuit card by encrypting a content of the mass storage file using a key determined by a mass storage secure controller of the large capacity universal integrated circuit card, the mass storage file comprising the content;
   associating the mass storage file stored in the mass storage file system with an ISO directory file of an ISO file system of the large capacity universal integrated circuit card, wherein the ISO directory file in the ISO file system is associated with a security configuration defining security requirements for accessing the ISO directory file of the ISO file system, further wherein the ISO directory file is a directory file according to ISO 7816, further wherein the associating of the mass storage file stored in the mass storage file system with the ISO directory file of the ISO file system is performed by the mass storage secure controller located in the large capacity universal integrated circuit card;
   securing the content of the mass storage file stored in the mass storage file system in order to make the content inaccessible;
   revealing the content of the mass storage file if the security requirements of the ISO directory file in the ISO file system are met;
   requesting access from the mass storage file system to the content of the mass storage file stored in the mass storage file system;
   determining if the content is securely stored;
   in response to determining that the content is securely stored, delivering security requirements to the ISO file system and determining whether the delivered security requirements meet the security requirements defined by the security configuration associated with the ISO directory file of the ISO file system which is associated with the mass storage file stored in the mass storage file system;
   in response to determining that the security requirements are met, revealing the content of the mass storage file stored in the mass storage file system.

2. The method according to claim 1, wherein the requesting access to the content of the mass storage file stored in the mass storage file system is performed by an application running in a host device which communicates with the large capacity universal integrated circuit card; and the delivering of security requirements in response to determining that the content is securely stored is performed by the application.

3. The method according to claim 1, wherein the delivering of security requirements is carried over an ISO channel.

4. The method according to claim 1, wherein the revealing of the content is performed by the mass storage secure controller which communicates with the ISO file system to determine whether the delivered security requirements are met and accesses the mass storage file system to reveal the content.

5. The method according to claim 1, wherein the content is revealed by decrypting the content using the key determined by the mass storage secure controller of the large capacity universal integrated circuit card.

6. The method according to claim 2, further comprising, after revealing the content of the mass storage file stored in the mass storage file system, accessing of the revealed content of the mass storage file by the application running in the host device.

7. The method according to claim 1, further comprising delivering the content once revealed through a high speed channel.

8. The method according to claim 1, wherein the content of the mass storage file is stored in a securely stored partition.

9. A large capacity universal integrated circuit card comprising:
   an ISO file system and a UICC operating system, the ISO file system being controlled by the UICC operating system;
   a mass storage file system comprising a mass storage file, the mass storage file comprising a content, the content being encrypted by a key;
   a mass storage secure controller operative to:
   associate the mass storage file stored in the mass storage file system with an ISO directory file of the ISO file system, wherein the ISO directory file in the ISO file system is associated with a security configuration defining security requirements for accessing the ISO directory file of the ISO file system, and further wherein the ISO directory file is a directory file according to ISO 7816;
   secure the content of the mass storage file stored in the mass storage file system in order to make the content inaccessible;
   reveal the content of the mass storage file if the security requirements of the ISO directory file in the ISO file system are met;
   request access from the mass storage file system to the content of the mass storage file stored in the mass storage file system;
   determine if the content is securely stored;
   in response to determining that the content is securely stored, deliver security requirements to the ISO file system and determining whether the delivered security requirements meet the security requirements defined by the security configuration associated with the ISO directory file of the ISO file system which is associated with the mass storage file stored in the mass storage file system;
   determine if the security requirements are met; and
   in response to determining that the security requirements are met, revealing the content of the mass storage file stored in the mass storage file system.

10. The large capacity universal integrated circuit card according to claim 9, wherein the mass storage secure controller securely stores and reveals content of the mass storage file stored in a hidden partition in the mass storage file system.

11. The large capacity universal integrated circuit card according to claim 9, further comprising:
   means for communicating with an application running in a host device; and
   a memory controller providing the application running in the host device with access to the mass storage file system of the large capacity universal integrated circuit card.

12. The large capacity universal integrated circuit card according to claim 9, wherein the mass storage file system is controlled by a host operating system.

13. The large capacity universal integrated circuit card according to claim 9, wherein the ISO interface is used by the application for delivering to the ISO file system the security requirements defined by the security configuration associated with an ISO directory file of the ISO file system which is associated with the mass storage file stored in the mass storage file system.

14. The large capacity universal integrated circuit card according to claim 9, further comprising:
   a high speed interface for communicating the memory controller with the application through the host operating system, wherein the high speed interface is used by the mass storage file system for delivering to the application the content of the mass storage file stored in the mass storage file system.

15. The large capacity universal integrated circuit card according to claim 9, wherein the high speed interface is used by the mass storage file system for delivering to the application the content once revealed by the mass storage secure controller.

16. The large capacity universal integrated circuit card according to claim 9, wherein the content of the mass storage file is stored in a securely stored partition.

* * * * *